United States Patent [19]
Williams

[11] Patent Number: 5,873,567
[45] Date of Patent: Feb. 23, 1999

[54] SYSTEMS, METHODS AND COMPUTER PROGRAM PRODUCTS FOR POSITIONING WOOD TRUSSES FOR FABRICATION AND DELIVERY

[75] Inventor: Tomas H. Williams, Edenton, N.C.

[73] Assignee: Tee-Lok Corporation, Edenton, N.C.

[21] Appl. No.: 825,117

[22] Filed: Mar. 27, 1997

Related U.S. Application Data

[63] Continuation-in-part of Ser. No. 735,415, Oct. 22, 1996, Pat. No. 5,810,341.

[60] Provisional application No. 60/006,169 Nov. 2, 1995.

[51] Int. Cl.[6] ........................................ B25B 1/20
[52] U.S. Cl. ...................... 269/37; 269/910; 269/304; 29/281.5
[58] Field of Search ........................ 269/37, 99, 100, 269/101, 910, 905, 303, 305, 315; 100/295, 913; 29/281.3; 364/468, 512

[56] References Cited

U.S. PATENT DOCUMENTS

| | | | |
|---|---|---|---|
| 5,211,381 | 5/1993 | Shaw | 269/37 |
| 5,342,030 | 8/1994 | Taylor | 269/304 |
| 5,385,339 | 1/1995 | Williams | 269/37 |
| 5,388,318 | 2/1995 | Petta | 364/468 |
| 5,430,662 | 7/1995 | Ahonen | 364/512 |
| 5,506,914 | 4/1996 | Baker | 364/468 |
| 5,702,095 | 12/1997 | Williams | 267/37 |

Primary Examiner—David A. Scherbel
Assistant Examiner—Lee Wilson
Attorney, Agent, or Firm—Myers Bigel Sibley & Sajovec

[57] ABSTRACT

Systems, methods, and computer program products are provided for positioning a truss on a plurality of spaced apart truss tables and for positioning a truss bundle on an expandable rollerbed trailer. A movable image of a truss is superimposed on a stationary image of each of the truss tables. The truss image includes indicia at each location where a respective truss plate is to be embedded in the truss. The indicia has a distinct appearance when a portion of a respective truss plate location overlies an ejector unit slot or space between adjacent truss tables. A movable image of a truss bundle is superimposed on a stationary image of an expandable rollerbed trailer.

40 Claims, 20 Drawing Sheets

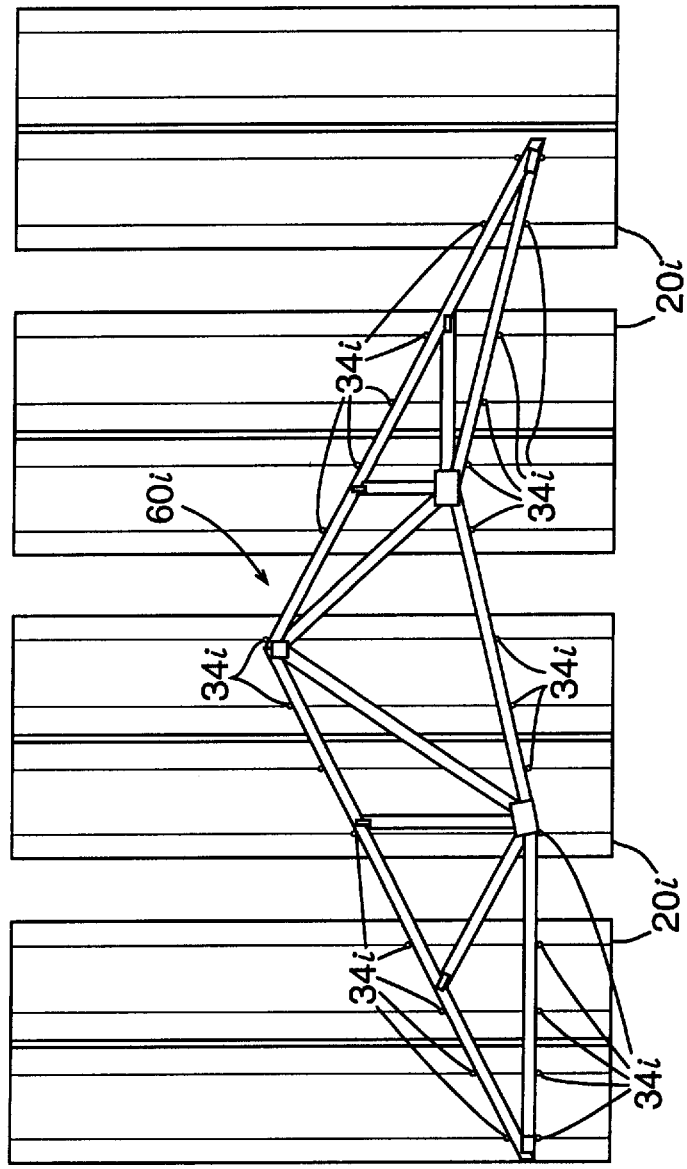

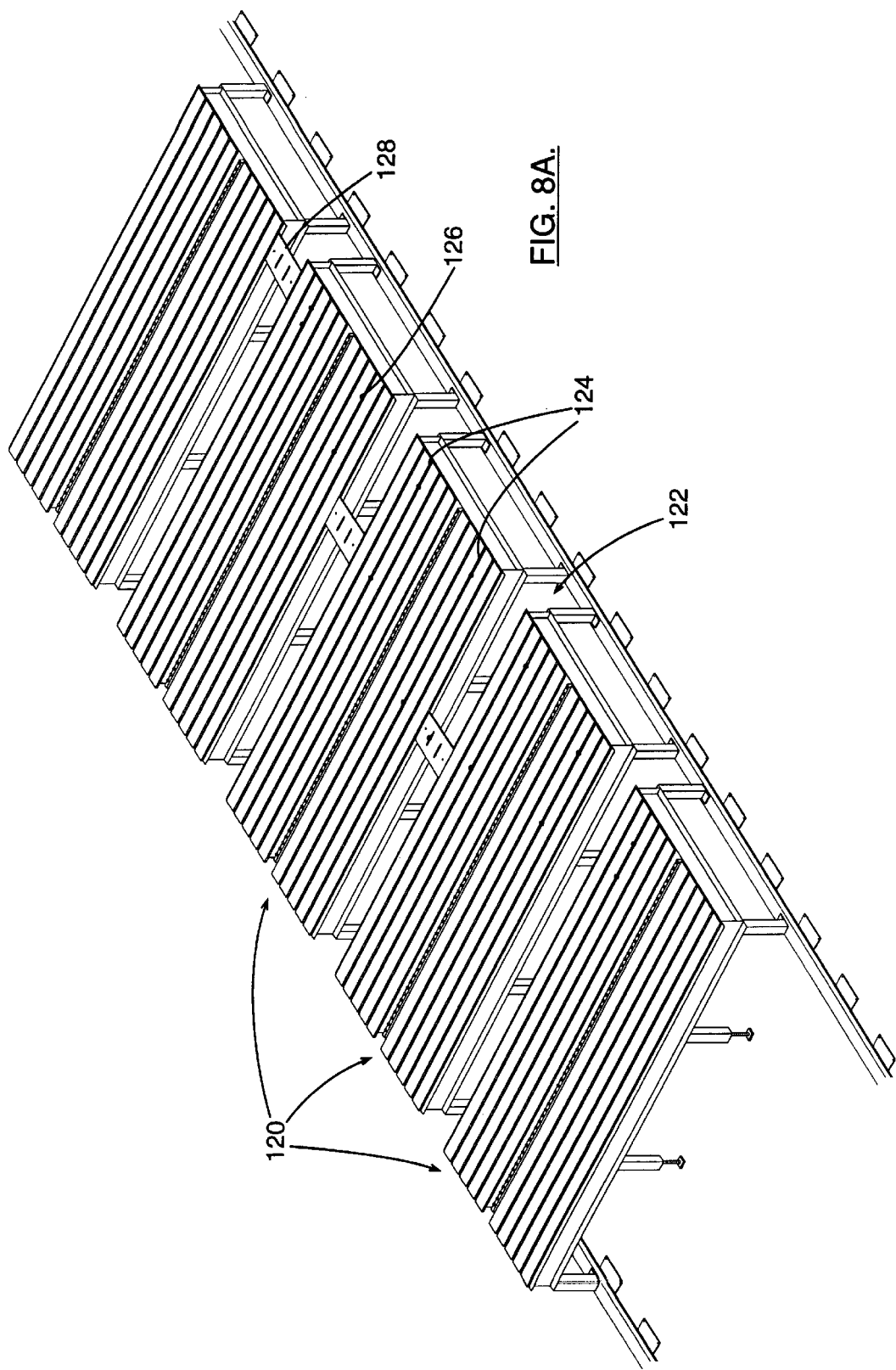

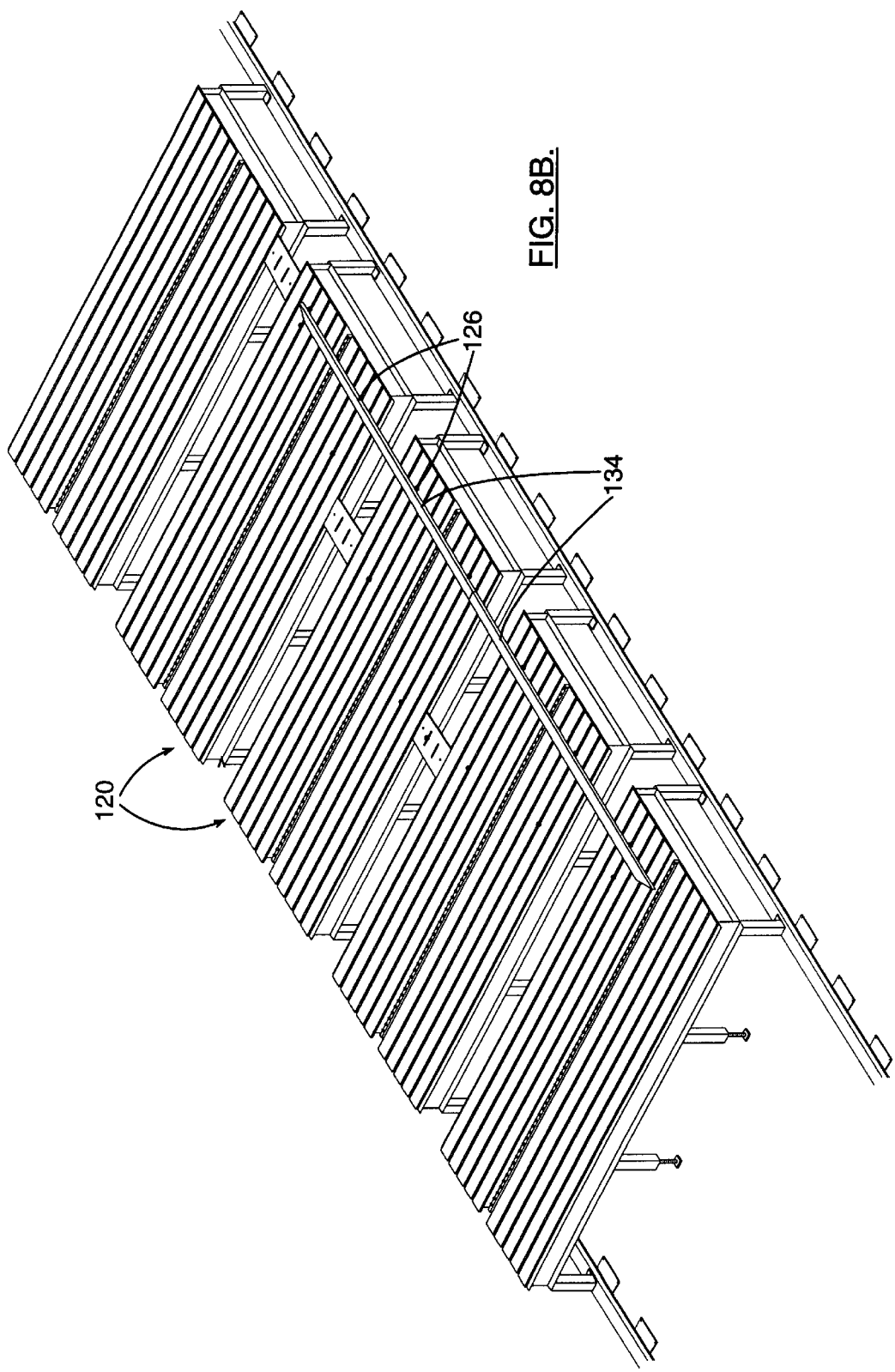

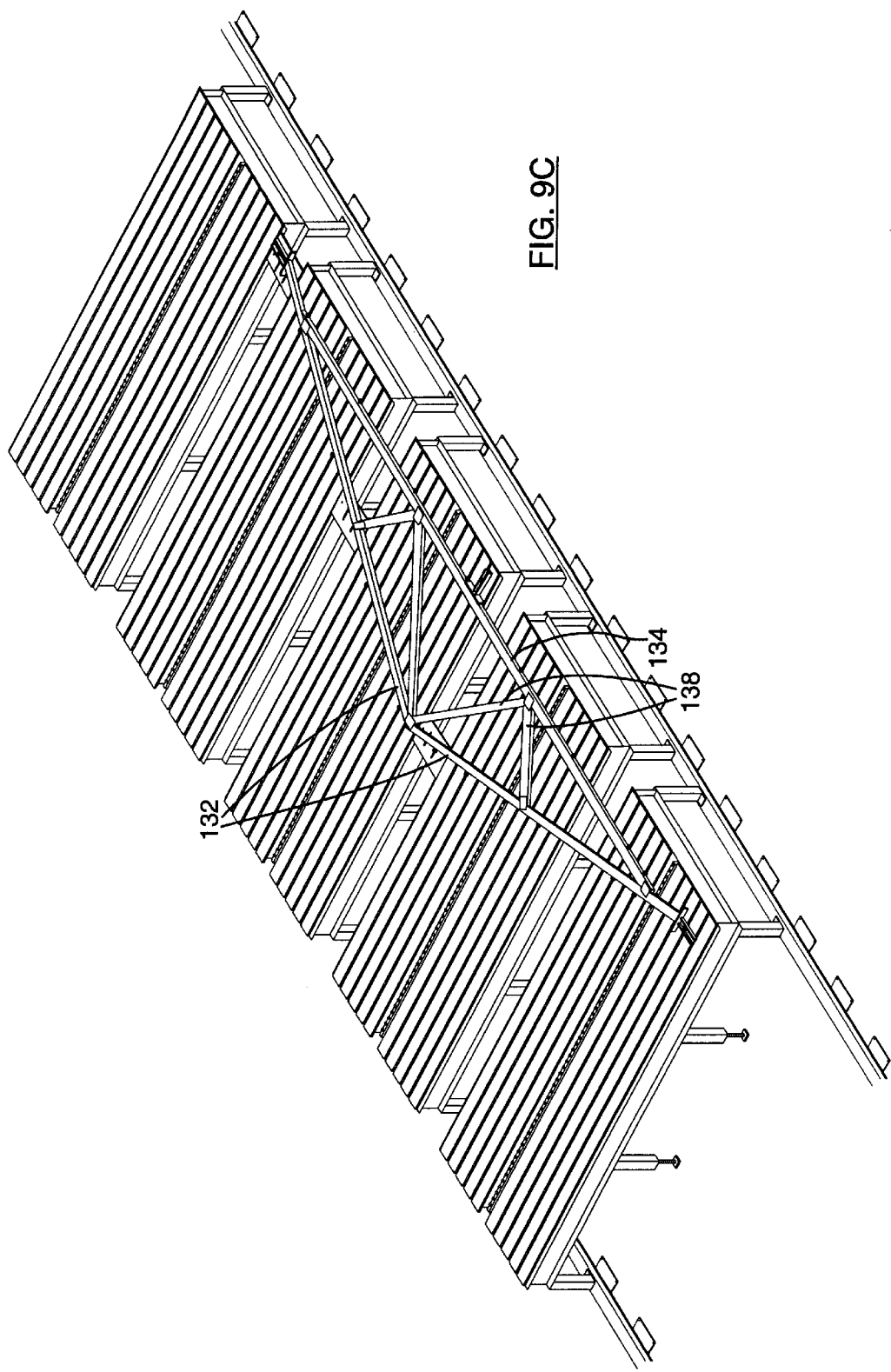

SYSTEMS, METHODS AND COMPUTER PROGRAM PRODUCTS FOR POSITIONING WOOD TRUSSES FOR FABRICATION AND DELIVERY

RELATED APPLICATION

This application is a continuation-in-part of and co-assigned U.S. patent application Ser. No. 08/735,415, filed on Oct. 22, 1996, now U.S. Pat. No. 5,810,341 which claims priority from U.S. Provisional Patent Application Ser. No. 60/006,169 filed on Nov. 2, 1995.

FIELD OF THE INVENTION

The present invention relates generally to wood trusses, and more particularly to wood truss fabrication.

BACKGROUND OF THE INVENTION

A wood truss consists of multiple planks of lumber joined together via metal connector plates, commonly referred to as truss plates. A wood truss typically comprises top and bottom chords joined by web members to form various triangular patterns. The design of a wood truss involves selecting a span and pitch to satisfy a particular architectural plan and then utilizing various engineering methods to determine the shape of the truss and the web pattern required, as well as the size and length of each member required based upon the various loads that the truss may be subjected to during use.

Because of the size of a typical truss (e.g., one that is 45 feet in length), truss fabrication is typically performed on one or a series of fabrication tables. The lumber planks are placed on the fabrication tables in an arrangement to match the final desired shape of the truss. Truss plates having impaling members extending from one side are placed at each joint where the ends of the lumber planks are to be joined. Typically, a system of pressure rollers is used to embed the impaling members of each truss plate into the lumber planks to create a truss.

To achieve a strong connection at each joint, it is necessary that the impaling members of each truss plate are pressed firmly into the wood. This is accomplished by pressing each truss plate downwardly against the surface of the truss table, which provides the resistance necessary to ensure the firm embedment of each truss plate. Unfortunately, when a series of spaced-apart truss tables are employed, the size and configuration of a wood truss often results in one or more truss joints being unsupported by a truss table. As a result, pedestals are typically positioned under these truss plates to provide resistance during the pressing operation. Of course, the pedestals provide less support, and the use of pedestals between truss tables hampers the movement of operators who move therebetween to place lumber planks and truss plates on the truss tables. Consequently, the use of pedestals is discouraged.

Many truss tables utilize an ejector unit for raising a truss so that it may be removed easily from the truss table when completed. An ejector unit typically resides within and extends from a slot in the surface of each truss table. It is desirable to avoid locating a truss joint directly over an ejector unit slot because of the risk of inadequate resistance during pressing of a truss plate into the joint area.

A particularly time-consuming task associated with truss fabrication is the process of setting up the truss tables for a particular truss configuration. A set-up system typically includes placing a number of jigging fixtures and/or mechanical stops on each truss table in a pattern matching that of the truss configuration. Typically, the mechanical stops are used to hold the top and bottom chords in place. The remaining planks for each truss are precut to the proper length and end angle and are arranged on the fabrication tables in the correct triangulated truss configuration prior to being fixed into that configuration with truss plates.

Each mechanical stop typically includes some means for being secured to a fabrication table. Often times a graduated scale is attached to each table adjacent each slot. Once positioned, the mechanical stops are tightened down so as to provide a solid location against which the truss planks may be held in place. The positions of the mechanical stops may be determined in advance for a truss either manually or by a software program associated with the set-up system, such as the FREEFORM™ program offered by Tee-Lok Corporation, Edenton, N.C. Once the planks are arranged on the truss tables, they are attached to one another by a pressure roller, such as that described above, which presses a truss plate into each joint area to form the truss. The completed truss is removed from the table via the ejector unit, and another set of planks is guided into position within the mechanical stops. The mechanical stops remain in place until all trusses of the selected configuration have been formed. They are then re-positioned on the truss tables to define the next truss configuration to be fabricated.

Unfortunately, the process of positioning and repositioning the mechanical stops has the tendency to slow truss production considerably. This is particularly true when sets of trusses of significantly different configuration are constructed sequentially, as this requires considerable repositioning of the cogs.

Trusses are often transported via an expandable rollerbed trailer. Trusses are often large and irregularly shaped, making the task of fitting a load of trusses onto an expandable rollerbed trailer a somewhat difficult and costly task. Adding to the cost of truss transportation are shipping regulations which often limit the "over-length" and "over-width" dimensions of materials transported on expandable rollerbed trailers. If truss overhang exceeds that permitted by law, special permits are often required. These special permits often limit the routes and times of travel, thus adding to the cost of truss transportation. In addition, it is often desirable to load an expandable rollerbed trailer in such a way that the trusses can be unloaded at a construction site in the order in which they will be used during construction. Each of these factors can render the loading of trusses onto an expandable rollerbed trailer an expensive and time consuming trial and error operation.

SUMMARY OF THE INVENTION

In view of the foregoing, it is an object of the present invention to facilitate the positioning of truss planks to be joined via truss plates on a series of set-up tables such that the number of truss plates overlying any space between setup tables is minimized.

It is another object of the present invention to facilitate the positioning of truss planks to be joined via truss plates on a series of set-up tables such that no truss plate overlies an ejector unit slot within a set-up table.

It is yet another object of the present invention to facilitate fabricating trusses with different configurations wherein the time required to re-position mechanical stops is minimized.

Another object of the present invention is to facilitate loading trusses onto expandable rollerbed trailers wherein the time required to load is minimized and wherein the trusses are arranged efficiently and for selective unloading.

These and other objects are accomplished, according to the present invention, by systems, methods, and computer program products for positioning a truss on a plurality of spaced apart truss tables via a data processing system comprising an input device and a display. A movable image of a truss is superimposed on a stationary image of each of the truss tables. Each truss table image may include a representation of an ejector unit slot.

The truss image includes indicia at each location where a respective truss plate is to be embedded in the truss. The indicia has a first appearance when a respective truss plate location completely overlies a truss table image and a second appearance, different from the first appearance, when a portion of the respective truss plate location overlies the space between adjacent truss table images. The indicia may also have a third appearance, different from the first and second appearances, when a portion of the respective truss plate location overlies an ejector unit slot. The second and third appearances may be visually similar or dissimilar. The indicia may display a visually compelling color, such as red, when a portion of a respective truss plate location overlies an ejector unit slot or space between adjacent truss tables.

Using an input device, such as a keyboard or mouse, a user can position the truss image with respect to each of the truss table images such that indicia for as many truss plate locations as possible have the first appearance (indicating that each respective truss plate location completely overlies one of the truss tables). The user positioning can include moving the truss image laterally (i.e., in a direction perpendicular to the slots in the truss tables) and rotating the truss image about an axis normal to the truss table images. The truss image may be automatically positioned with respect to each of the truss table images such that indicia for as many truss plate locations as possible have the first appearance. Once positioned, the positions of the mechanical stops for restraining the truss during fabrication are determined. Representations of the mechanical stops may be displayed and their positions may be printed to facilitate placing the mechanical stops on the truss tables. If one or more truss plate locations overlie the space between adjacent truss tables, an image of a pedestal may be displayed beneath the truss plate location.

According to another aspect of the present invention, systems, methods and computer program products are provided for efficiently stacking various shaped trusses on top of each other in a predetermined order. Movable images of trusses are superimposed on a stationary image of an expandable rollerbed trailer. The expandable rollerbed trailer image includes a grid system to facilitate positioning of the various truss images thereon. A user can position the various truss images on the image of the expandable rollerbed trailer so as to achieve an optimum arrangement thereon. Once an optimum arrangement is achieved, operators can position the actual trusses on an expandable rollerbed trailer accordingly.

The present invention is advantageous because it facilitates placing truss planks on multiple truss tables such that locations where the planks are to be joined do not overlie either spaces between the tables or lift-out slots in the table surfaces. If the truss image indicates that a truss plate is to be located directly above one of the lift-out slots or one of the spaces between tables, the user is warned. The user may then move the truss image on the computer display relative to the truss table images until the joint position is improved.

The present invention is also advantageous because it can be used to determine a preferred production sequence for sets of trusses. Thus, truss images having different configurations can be positioned on the truss table images such that, when the actual trusses are constructed, a minimum number of mechanical stops require repositioning when switching fabrication of one truss configuration to another. This results in efficient use of the truss tables and increased production throughput because less time is required for changeover from one truss configuration to another.

The present invention is also advantageous because it reduces the time and cost associated with the positioning of trusses onto an expandable rollerbed trailer for shipping. Trusses with various configurations can be arranged efficiently and so as to comply with various shipping regulations, without requiring trial and error positioning of the actual trusses.

BRIEF DESCRIPTION OF THE DRAWINGS

FIG. 5A illustrates the display of a movable image of a truss having a first configuration superimposed on a fixed image of four truss tables.

FIGS. 8A through 8E illustrate steps followed in setting up a truss table for a production run.

FIGS. 9A through 9C illustrate steps followed in producing trusses during a production run.

DETAILED DESCRIPTION OF PREFERRED EMBODIMENTS

Figure 1:
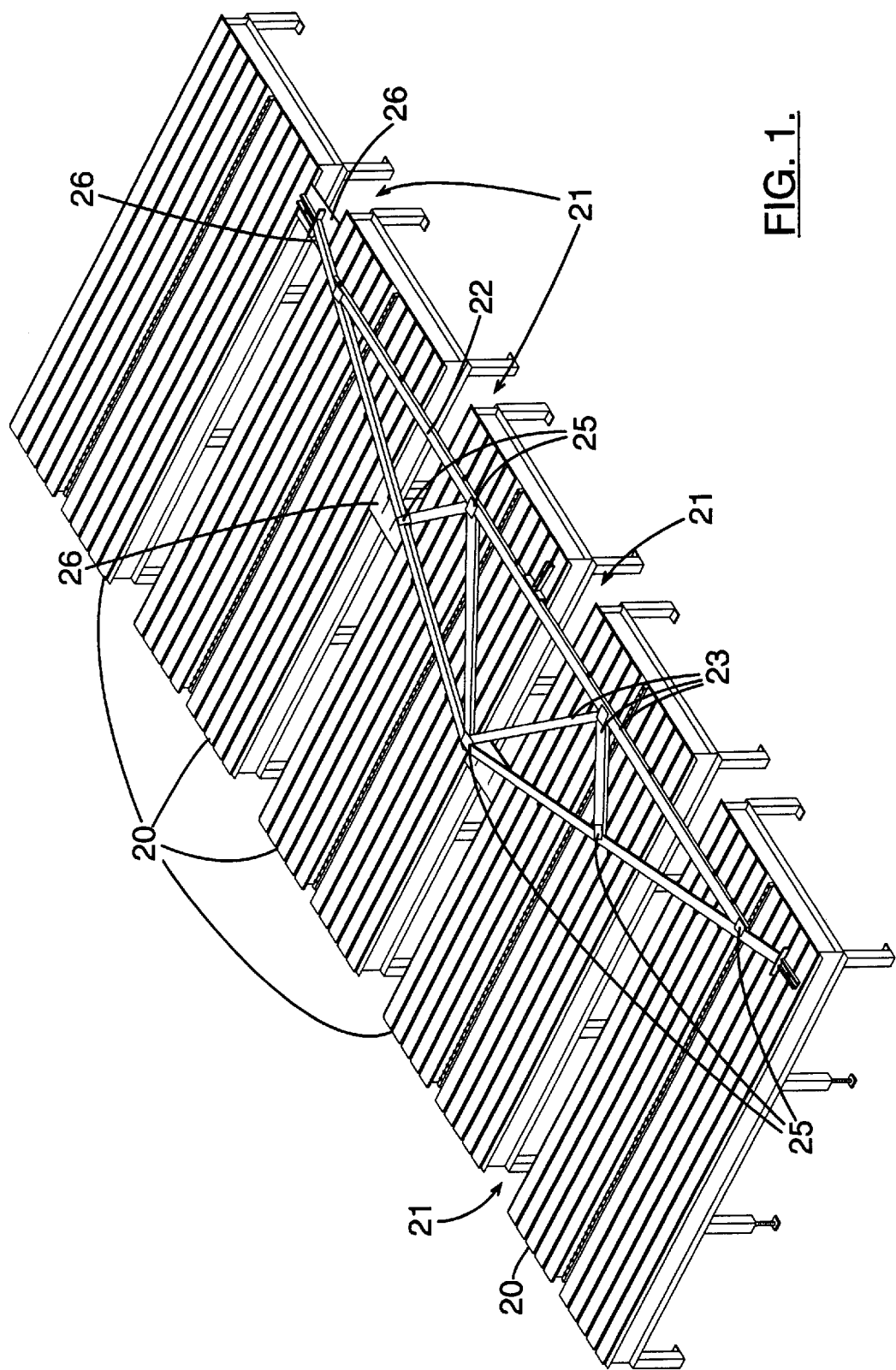
FIG. 1 is a perspective view of five truss tables used in combination to support a truss during fabrication.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computerreadable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Exemplary Truss Fabrication

Referring now to FIG. 1, multiple truss tables 20 in spaced-apart, adjacent relationship are supporting a truss 22 during fabrication. The truss 22 comprises a number of wooden planks 23 (also referred to as truss elements) which are arranged in a triangulated web pattern. The planks 23 are interconnected with one another by truss plates 25 which are embedded into the planks at each joint. The configuration of a truss can be any of those known to those skilled in this art to be suitable for interconnecting wooden planks. It should be understood that, although five truss tables 20 are illustrated herein, any number of truss tables can be employed together to construct a larger or smaller truss than that illustrated.

The illustrated truss 22 has several portions adjacent a respective truss plate 25 that overlie the space 21 between adjacent truss tables 20. In order to ensure adequate resistance during pressing of each truss plate 25 into the truss elements 23, a pedestal 26 is positioned beneath each of these truss portions as illustrated. Typically, a pedestal 26 is supported by adjacent truss tables 20; however, it may also be supported in other ways, such as from the floor.

Figure 2:
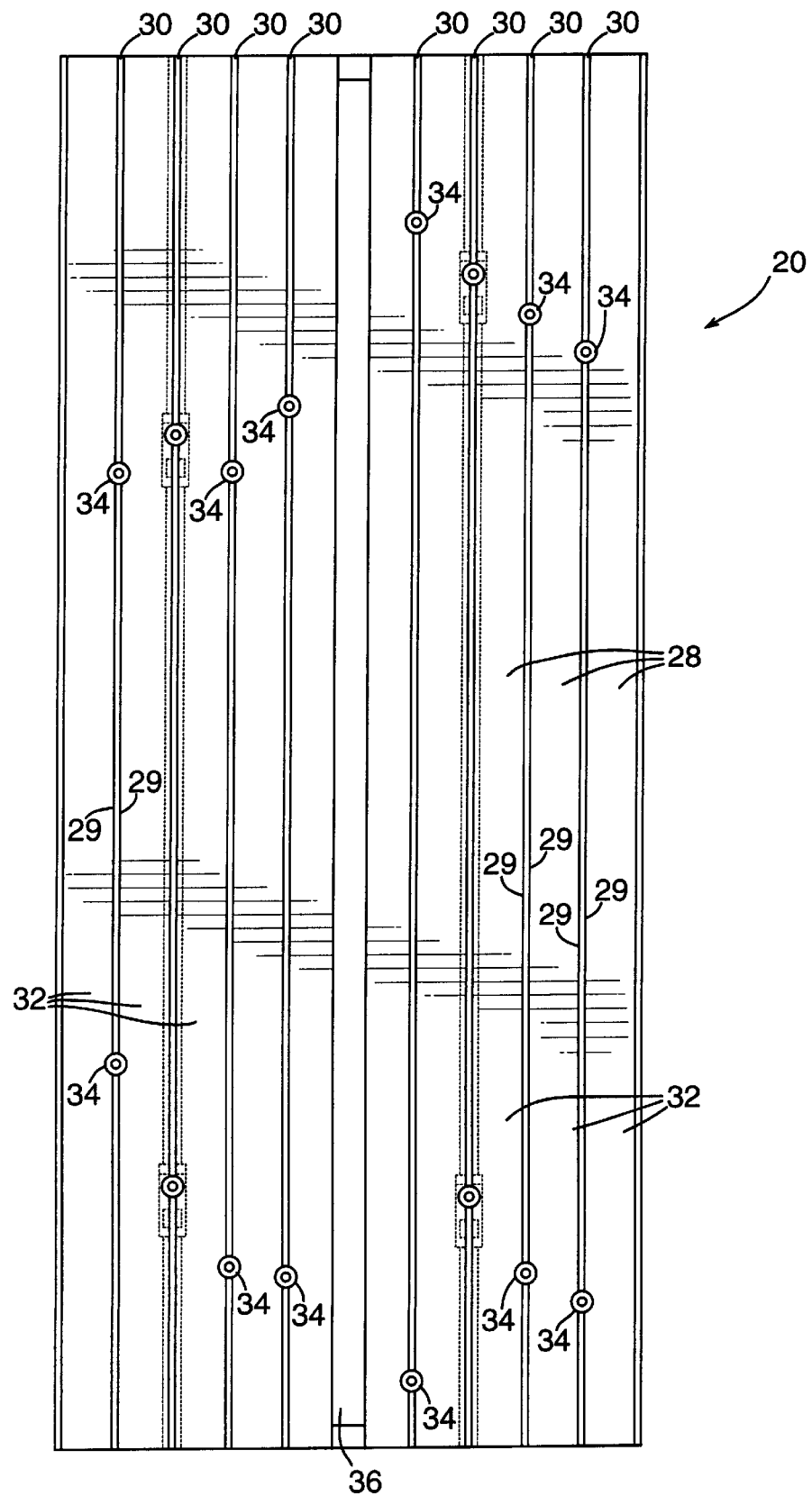
FIG. 2 is a plan view of a single truss table used to support a truss during fabrication.

Referring now to FIG. 2, a single truss table 20 is illustrated in greater detail. The truss table 20, which is available from Tee-Lok Corporation, Edenton, N.C., and is sold under the trademark TEE-SLOT™, includes a plurality of horizontally disposed steel panels 28 of varying widths. Those skilled in this art will recognize that the panels 28 can be of any desired width (e.g., 2 inch, 4 inch, 8 inch, 12 inch, or the like) or depth (e.g., ½ inch, 1 inch, or the like) that can withstand the rigors of truss construction. The panels 28 can be of any length sufficient to support a truss being constructed thereon.

The panels 28 are elongate and are oriented to be substantially parallel to one another. Opposed lateral edge portions 29 of adjacent panels 28 are in non-contacting adjacent relationship to the lateral edge portions 29 of adjacent panels 28, thereby forming jigging slots 30 therebetween. Each jigging slot 30 is typically between about ¼ and 1 inch or greater in width. The upper surfaces 32 of the panels 28 support the planks 23 of each truss 22 that is fabricated on the table 20.

The illustrated truss table 20 includes mechanical stops 34 that are positioned above and within the jigging slots 30 between adjacent panels 28. The mechanical stops 34 define the triangulated pattern of the truss 22 and thus aid in placement and retention of truss planks 23 prior to and during truss construction. The mechanical stops 34 can be of any configuration that those skilled in this art would recognize to be suitable for defining a truss plank pattern, for retaining truss planks in that pattern, and for slidably moving within the jigging slots 30.

Exemplary mechanical stop configurations include those illustrated in U.S. Pat. No. 5,085,414 to Weaver, those employed in the Tee-Lok Quick Set-Up System (available from Tee-Lok Corporation), and those illustrated and described in co-pending and co-assigned U.S. Pat. Ser. Nos. 08/522,283 and 08/735,415, each of which is hereby incorporated herein by reference in its entirety. Illustratively, two mechanical stops 34 are included per jigging slot 30; however, a jigging slot may contain zero, one, two, three, four, or even more mechanical stops as desired. It is preferred that the mechanical stops 34 be of a configuration that can be added to or removed from a jigging slot 30 as desired for a particular truss configuration.

Still referring to FIG. 2, each truss table 20 typically includes a centrally-located, longitudinally-extending ejector unit (not shown) located in a central slot 36 for ejecting trusses after fabrication is complete.

Truss Positioning for Fabrication

The present invention facilitates minimizing the use of pedestals by displaying movable images of each truss superimposed on a stationary image of truss tables via a computer display prior to the positioning of an actual truss on the truss tables. The present invention also facilitates minimizing jigging changes during fabrication runs by allowing images of the various truss configurations to be layered, one on top of the other, to determine an optimum jigging arrangement for the various truss configurations in a production run.

Minimizing Pedestal Use

Figure 3A:
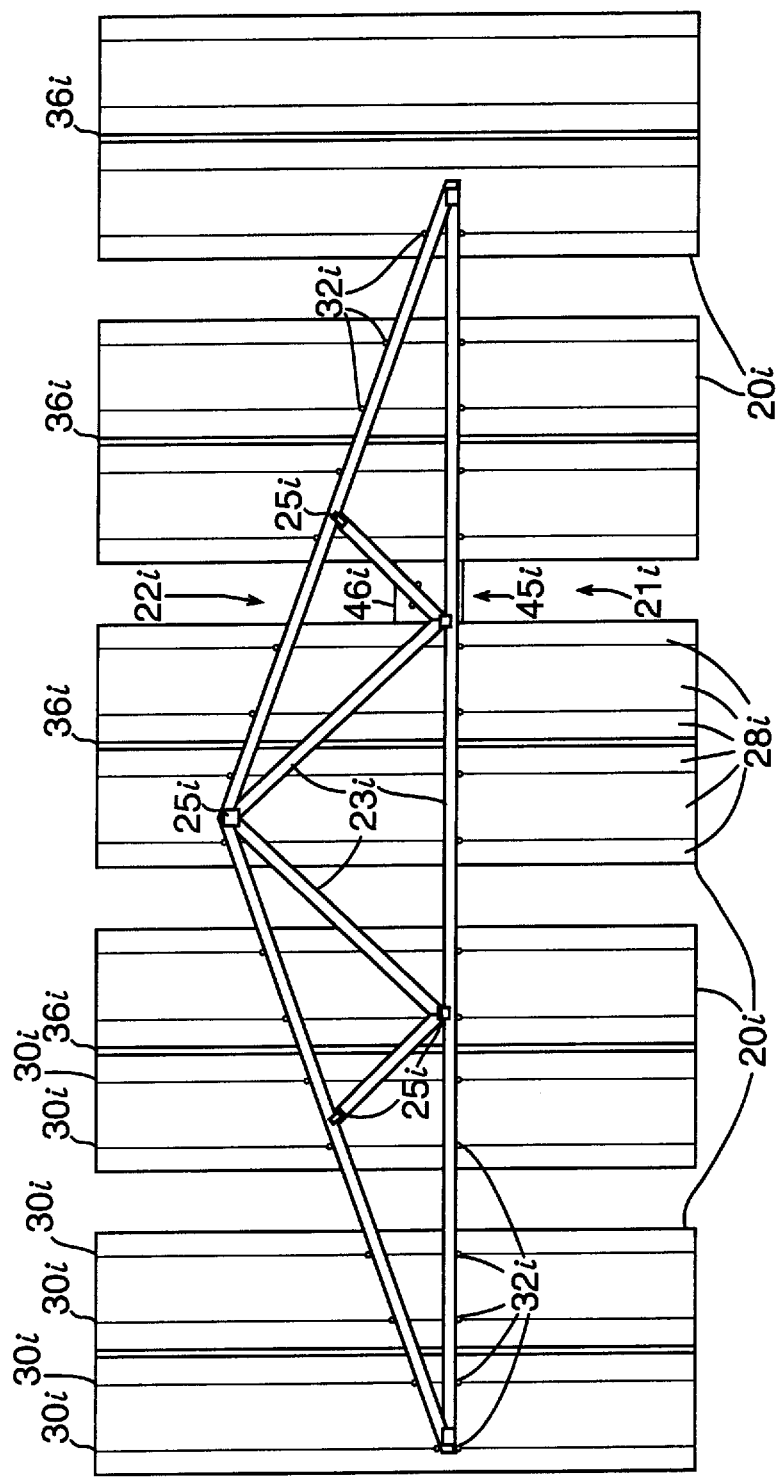
FIG. 3A illustrates the display of a movable image of a truss superimposed on a fixed image of five truss tables.

Referring now to FIG. 3A, a movable image 22i of a truss is superimposed over stationary images 20i of five truss tables. The movable truss image 22i includes an image 23i of each truss plank and an image 25i of each truss plate. For each truss table, the stationary image 20i includes an image 28i of each elongate panel, an image 30i of each jigging slot, an image 36i of each ejector unit slot, and an image 32i of each mechanical stop. As will be described in greater detail below, the movable truss image 22i and stationary truss table images 20i may be displayed via a computer display or monitor operatively coupled with a personal computer or other data processing system.

As shown in FIG. 3A, a truss joint 45i of the truss image 22i overlies the space 21i between adjacent truss table images 20i. An image of a pedestal 46i is shown supporting the truss joint 45i. Because the presence of a pedestal between adjacent truss tables hinders operator movement between the tables and provides less support than the table surface, it is preferable to position a truss on the truss tables so that pedestals are not required.

Figure 3B:
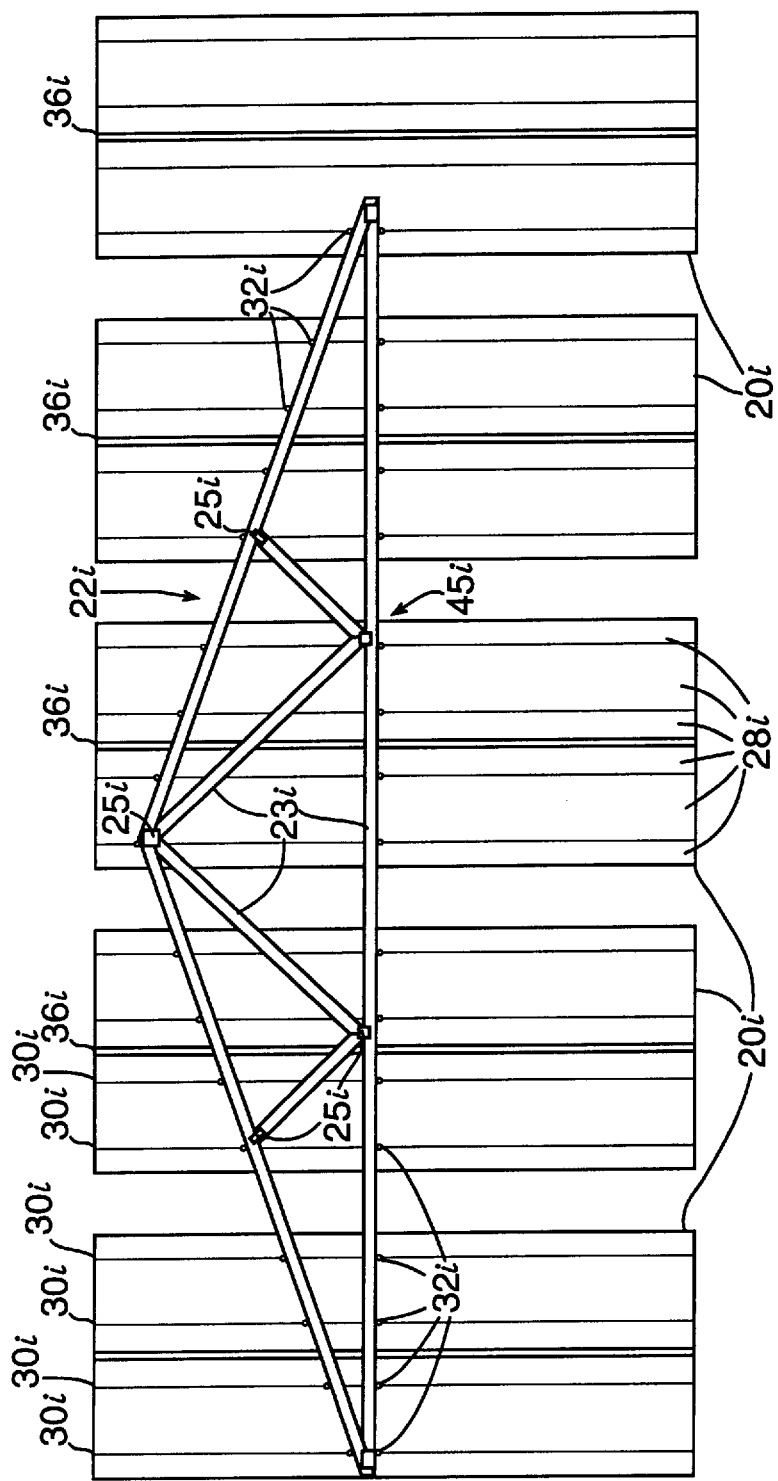
FIG. 3B is the movable truss image illustrated in FIG. 3A repositioned so as not to require a pedestal between adjacent tables.

Referring now to FIG. 3B, the movable truss image 22i has been repositioned with respect to the stationary images 20i of the truss tables such that no truss joints, including joint 45i, overlie the space 21i between adjacent truss tables. Consequently, as illustrated in FIG. 3B, a pedestal is no longer necessary because the truss joint 45i overlies a truss table. Once a preferred location of the truss image 22i relative to the stationary images 20i of the truss tables is achieved, the present invention determines X-Y coordinates or settings for the positions of mechanical stops placed in slots having scales or other position indicators. Preferably, a graphic illustration containing the X-Y coordinates of the mechanical stops is printed to assist operators in placing mechanical stops and truss planks on the truss tables. Using these settings, an operator can quickly position the mechanical stops on the actual truss tables such that all actual truss joints overlie a truss table.

Figure 4:
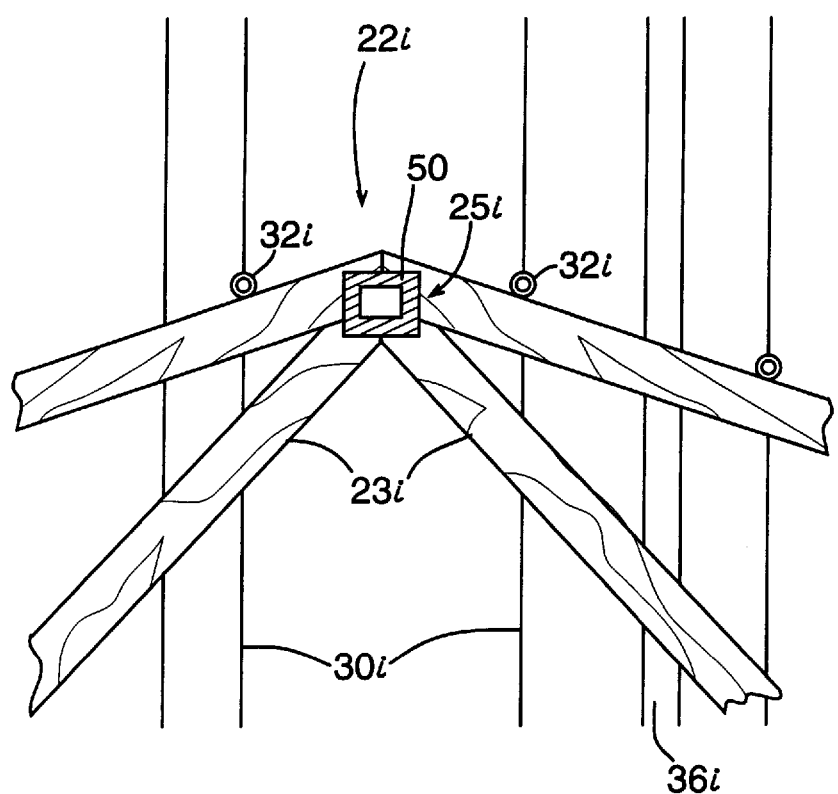
FIG. 4 illustrates an image of a truss plate having indicia associated therewith for indicating truss plate position relative to the truss tables.

The present invention facilitates rapid jigging set-up and minimizes the need for pedestals by allowing an operator to manipulate an image of a truss superimposed over an image of the truss tables. Time and effort are saved by allowing a user to manipulate the image of a truss on a screen such that all joints overlie a truss table, rather than experimenting with the position of an actual truss. Preferably, indicia 50 for indicating truss plate position with respect to a truss table is associated with each truss plate image 25i in the movable truss image 22i. In the illustrated embodiment of FIG. 4, a truss plate image 25i has indicia 50 surrounding the periphery thereof. However, a truss plate image 25i may have indicia associated therewith in any manner sufficient to adequately indicate a change of appearance to a user. The indicia 50 changes appearance to indicate when a respective truss plate image 25i has a portion overlying either the space between adjacent truss tables and/or the ejector unit slot in each truss table.

The present invention takes into account the size of each truss plate at each joint of a truss. A determination is made whether each truss plate image 25i is optimally located on the surface of a truss table image 20i by comparing the size and location of each plate with the location of the slots for the ejector units and the spaces between the truss tables. If a portion of the truss plate image 25i is located directly above one of the ejector unit slots 36i or the spaces 21i between truss tables, the user is warned by a change in the appearance on the screen of the indicia 50 surrounding the particular truss plate image 25i. Preferably the indicia 50 changes its appearance from a neutral color to a color such as red when a portion of the truss plate image 25i overlies the space 21i between truss tables or an ejector unit slot.

By utilizing a mouse, keyboard, or other input device, a user can manipulate and reposition a truss image 22i with respect to the truss table images 20i to optimally locate each truss plate over a truss table. An optimum truss position is achieved when the indicia 50 associated with each truss plate representation 25i has the same appearance, such as a neutral color, indicating that no portion of the actual truss plates will overlie the space between truss tables or ejector unit slots when positioned according to the truss image 22i.

Multiple Truss Configurations

Often, trusses having different configurations are required to be fabricated for a particular job. Typically, the truss configurations are somewhat similar, but often differ as a result of a different span or different chord slope. To efficiently fabricate trusses with different configurations, as many mechanical stops as possible should be left in the same position for each configuration. For example, if two trusses are the same for the most part except that one truss has been shortened by three feet (3') on one end, then all the stops for the two trusses may be positioned at the same locations except for the stops in the last three feet (3') of the first truss. The present invention facilitates simultaneous positioning of trusses having different configurations such that truss plates do not overlie space between adjacent truss tables or ejector unit slots. In addition, the present invention facilitates positioning more than one truss configuration at the same time such that a minimum number of mechanical stops need to be repositioned for the various configurations.

Figure 5B:
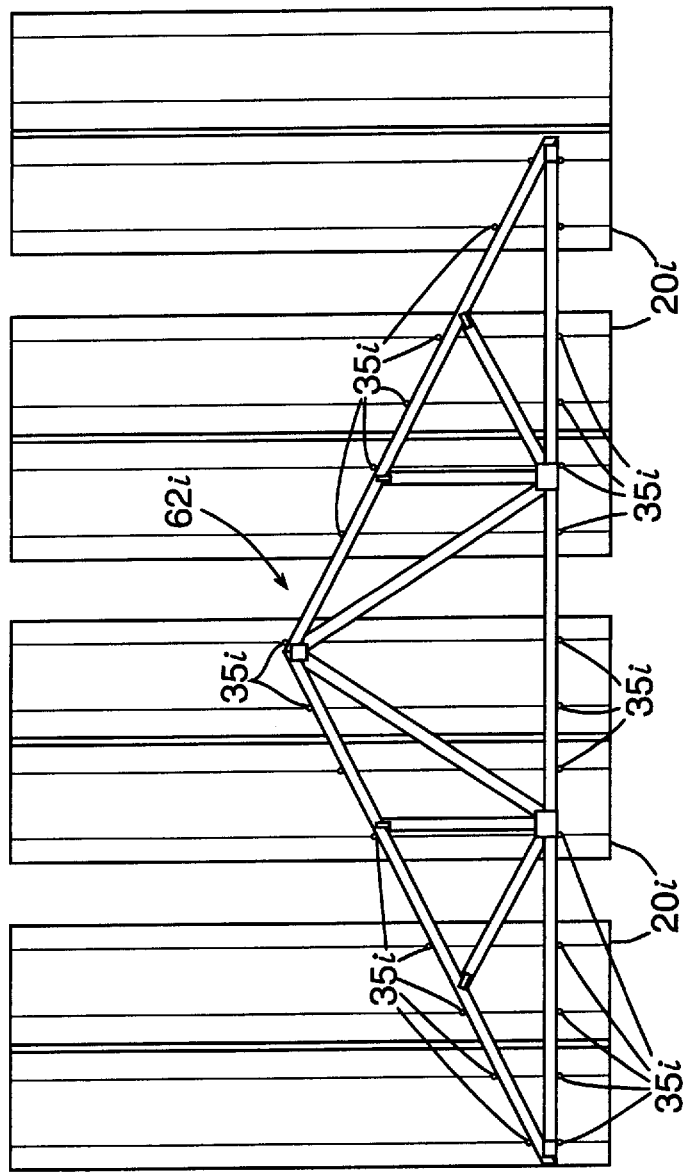
FIG. 5B illustrates the display of a movable image of a truss having a second configuration superimposed on a fixed image of four truss tables.
Figure 5C:
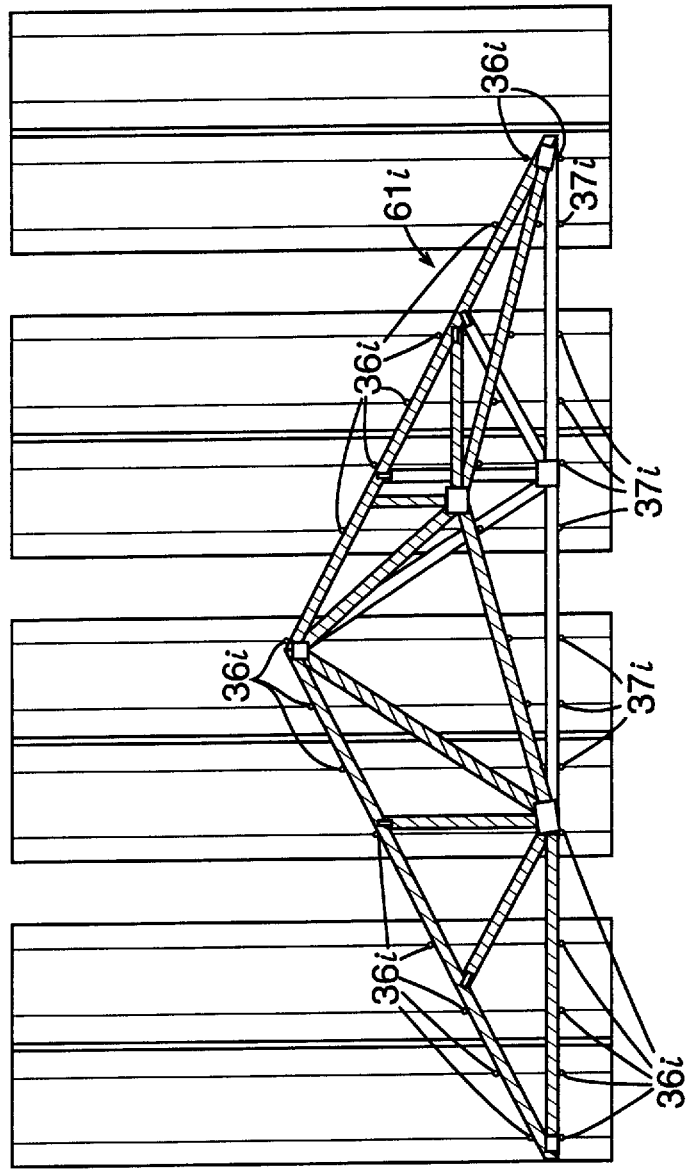
FIG. 5C illustrates the display of the movable images of the trusses illustrated in FIGS. 5A and 5B superimposed on a fixed image of four truss tables wherein common mechanical stops are utilized.

Referring now to FIG. 5A, a first truss image 60i having a first configuration is superimposed on a plurality of truss table images 20i. Mechanical stop images 34i indicate positions for actual mechanical stops for the first truss configuration. Referring now to FIG. 5B, a second truss image 62i having a second configuration is superimposed on a plurality of truss tables 20i. Mechanical stop images 35i indicate positions for actual mechanical stops for the second truss configuration. FIG. 5C illustrates the first and second trusses images 60i, 62i superimposed on a plurality of truss tables 20i. Mechanical stop images 36i indicate positions for actual mechanical stops common to the first and second truss configurations. Mechanical stop images 37i indicate the mechanical stops that are re-positioned for the second truss configuration.

Computer Program Operations

Figure 6:
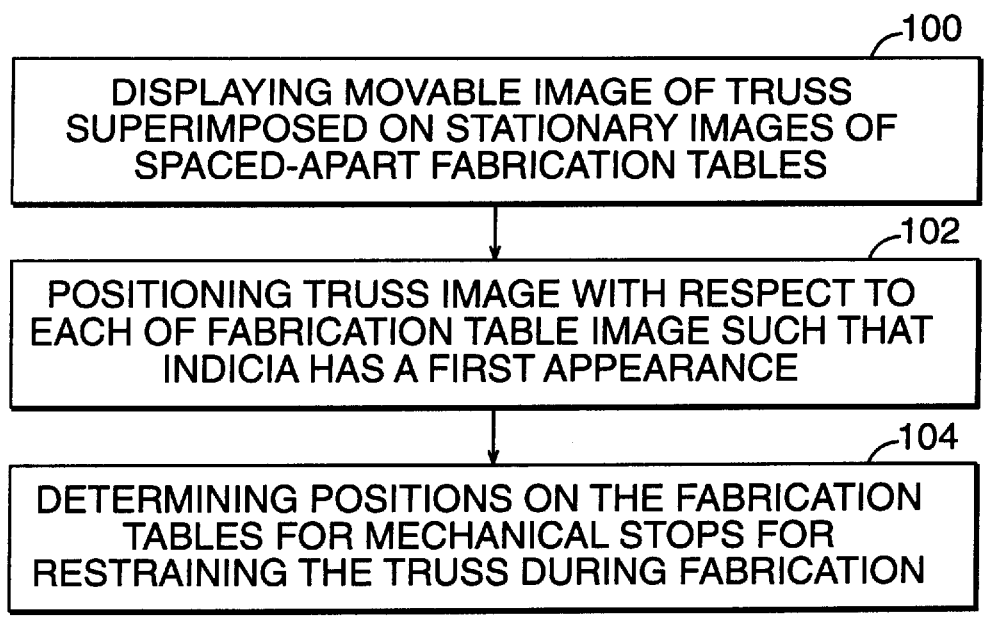
FIG. 6 illustrates operations for positioning a truss on a plurality of spaced apart truss tables, according to the present invention.

Referring now to FIG. 6, operations for the present invention include: displaying a movable image of a truss superimposed on stationary images of the spaced-apart truss tables (Block 100); positioning the truss image with respect to each of the truss table images such that indicia for at least one truss plate location has a first appearance (Block 102); and determining positions on the truss tables for mechanical stops for restraining the truss during fabrication (Block 104).

The truss image includes indicia at each location where a respective truss plate is to be embedded in the truss. The indicia has a first appearance when a respective truss plate location completely overlies a truss table image and a second appearance, different from the first appearance, when a portion of the respective truss plate location overlies the space between adjacent truss table images. A user positions the truss image on the truss table images such that as many truss plate locations completely overlie a truss table as possible.

The indicia associated with each truss plate location will visually display a first appearance to the user indicating when the respective truss plate location completely overlies a truss table. The indicia associated with each truss plate location will visually display a second appearance to the user indicating when the respective truss plate location has a portion overlying the space between adjacent truss tables. Preferably, the indicia associated with each truss plate location will visually display a third appearance to the user indicating when the respective truss plate location has a portion overlying an ejector unit slot in a truss table.

Initially, the desired size, shape and configuration of a truss is input into a computer within which the present invention is embodied. This input can be manually performed or can be the output of a truss construction program such as the FREEFORM™ described hereinabove. The truss is then displayed as a movable image on a computer screen. The truss image is superimposed over stationary images of truss tables which represent the actual location and configuration of the actual truss tables in the assembly shop. The initial default position of the truss image is typically a predetermined offset amount from the left-most truss table image as indicated in FIG. 3A.

The truss image includes an image of each truss plate to be embedded at a respective truss joint. Each truss image has indicia associated therewith that changes its appearance (preferably changes to a red color) when a portion of the truss plate overlies either a space between the truss tables or an ejector unit slot. The user is thus informed whether the initial default position of the truss is satisfactory or whether the truss needs to be re-positioned.

The user may then use a mouse, keyboard, or other computer input device to give instructions for moving the truss to improve its positioning on the truss tables. Preferably, the keyboard arrow keys are programmed to move the truss by a predetermined amount with respect to the truss tables. For example, pressing the "right arrow" key may cause the truss to move to the right by one inch (1"). Preferably, the user may also "drag" the truss using a mouse. This may be accomplished by placing the mouse icon on the truss, holding down the left mouse button, and then moving the truss.

Another feature of the present invention is the ability to rotate a truss image about a given point. Often, a truss may have a size, span or configuration such that the truss does not fit within the maximum outside dimensions of the truss tables. Typically, this is the case with trusses having a sloping bottom chord, such as mono-scissored or dogleg-shaped trusses. As a result, such trusses must be rotated about a point in order for it to fit on the truss tables.

Figure 7:
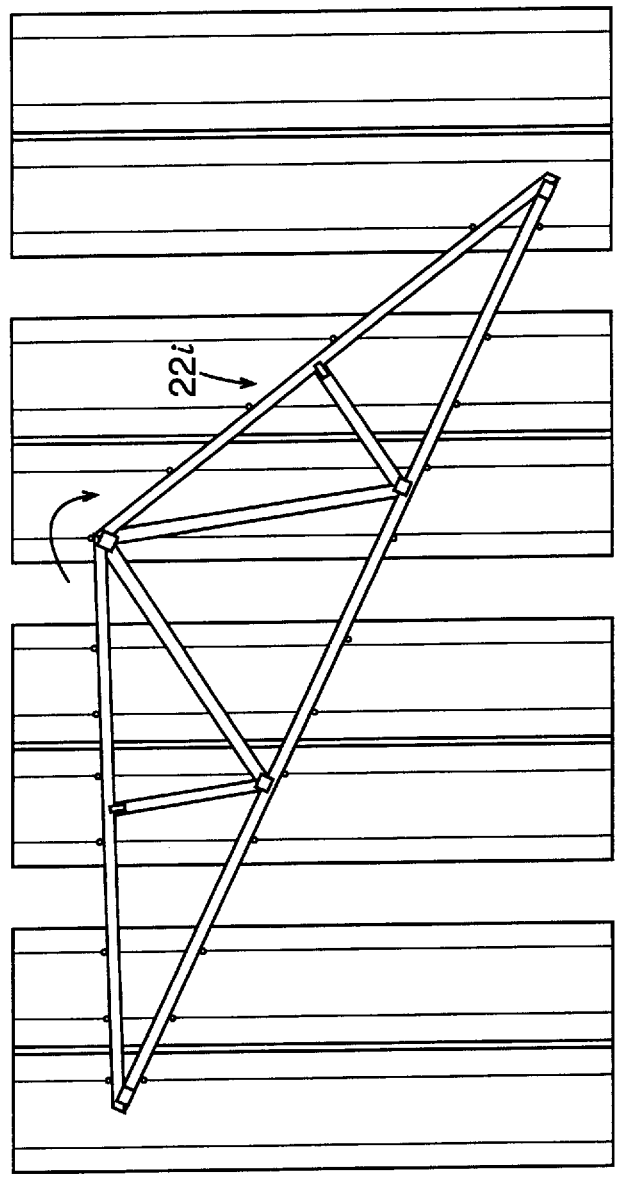
FIG. 7 illustrates the rotation of a truss image.

The present invention permits the user to rotate an image of a truss to determine the optimum position on the truss tables, without requiring experimentation with the actual truss. Rotation of the truss image may be accomplished by placing the mouse cursor on a rotation point on the truss, as illustrated in FIG. 7. Preferably, rotation points are highlighted with indicia of a different color. The user may drag a truss image about its various rotation points to facilitate finding an optimum position.

Another feature of the present invention is the ability to invert or "flip" a truss image end-for-end (left to right) or upside down. Preferably, this may be accomplished by using a mouse to activate designated buttons on the user's screen. Preferably, a truss image may be returned to its initial position by activating an "undo" button.

Often, a truss may need to be cambered. Camber is a process of pre-stressing a truss during fabrication. Typically, the bottom chord of a truss is prestressed by bending it slightly prior to embedding truss plates into the joint of the truss. The bending or pre-stressing of the chord is calculated to offset the final bending of the truss when loads are applied to the truss during use. Another feature of the present invention is that settings for mechanical stops can be calculated for cambered trusses.

Information relating to the position of a truss image may be displayed and printed for use by operators assembling trusses. Preferably, X-Y coordinates indicating the settings for the mechanical stops are provided along with an initial offset dimension from an edge of a truss table. If camber is to be used in truss fabrication, an allowance therefor can be made by the present invention in providing mechanical stop settings. Additional dimensions known and understood by those with skill in the art of truss fabrication may be provided including point to point dimensions, rafter lengths, square checks, and rake lengths. Preferably, when pedestals are required, the present invention provides location settings therefor.

Truss Production

The information produced by the display and positioning system of the present invention can be used to produce a truss on a series of truss tables, illustratively and preferably ones that include a plurality of steel panels separated by gaps or slots that receive positioning cogs (see FIGS. 8A through 8E and 9A through 9C). The tables themselves, designated broadly at 120, should be separated from one another by passageways 122 that enable a worker to walk therebetween. At least two slots 124 in each table 120 should include a measuring scale or other positioning indicia therein.

In a preferred method of constructing a truss, cogs 126 for the top and bottom chords of the truss are positioned within the slots 124 as directed by the computer program (FIG. 8A). Wherever it may be necessary or desirable, pedestal plates 128 can be positioned between adjacent tables 120 to provide a lower support surface; this is particularly desirable if a truss joint is positioned in a passageway 122. Alternatively, the positioning of cogs 126 for commonly constructed trusses can by permanently marked on the table 120 with a scoring fixture, paint, or other marking material.

After positioning of the top and bottom chord cogs 126, the "x-offset" starting point of the truss can be marked on the table 120 (with, for example, a pencil, as this position should change from truss to truss). This step establishes the leftmost portion of the bottom chord of the truss to enable the truss to be accurately positioned laterally.

Figure 8C:
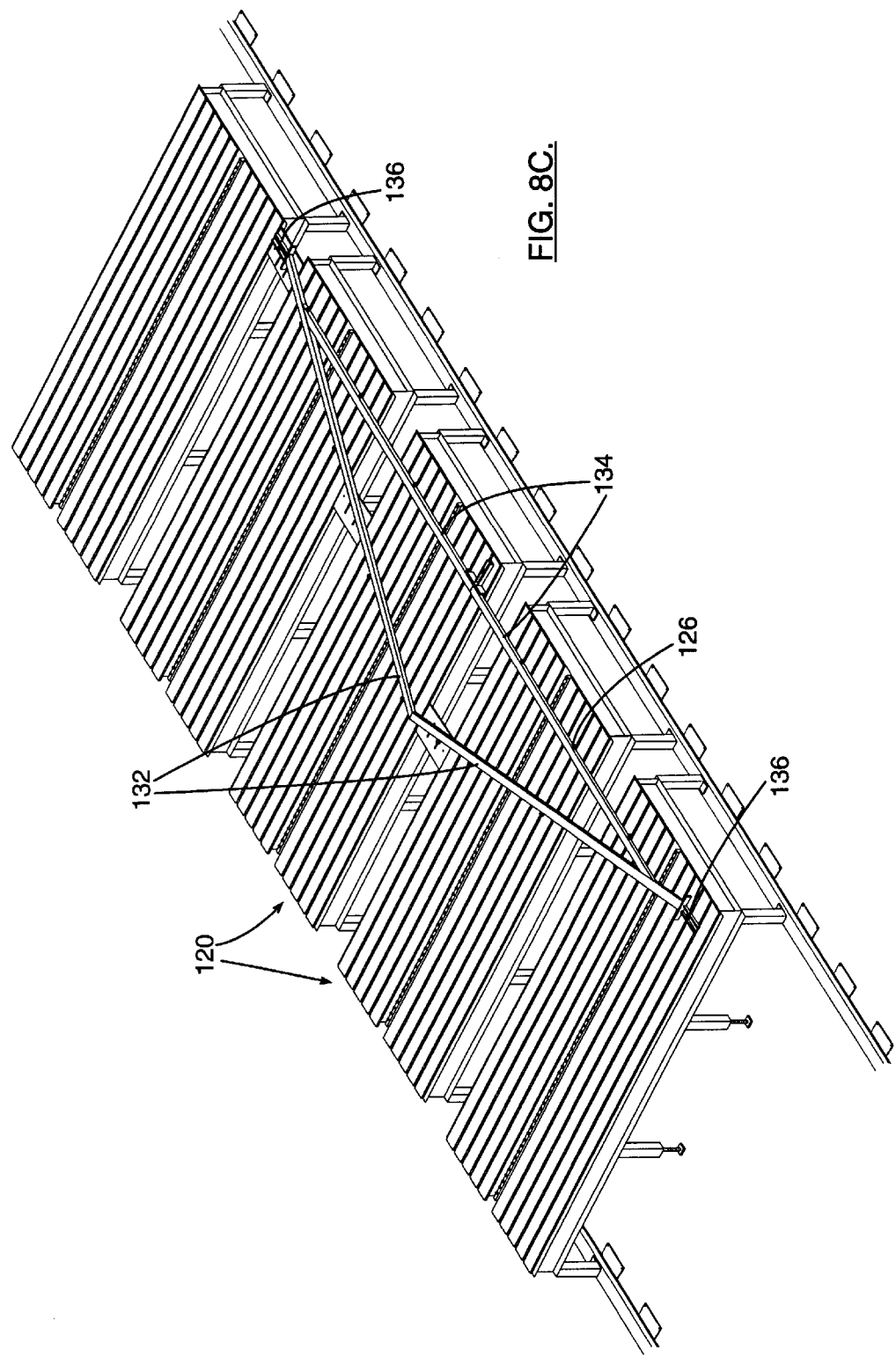
Figure 8D:
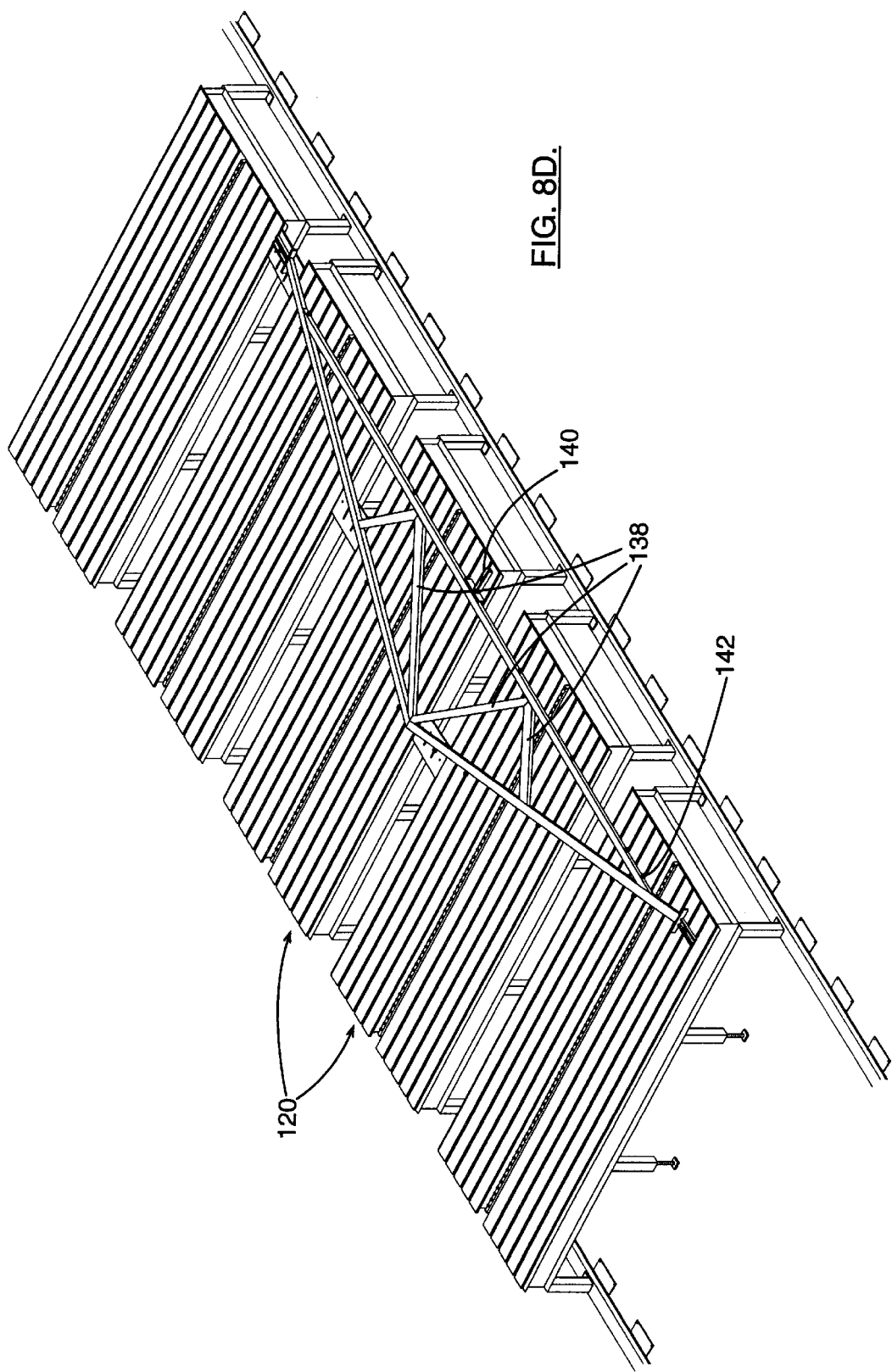

After the truss tables 120 are marked, a "set-up" truss 130 is then constructed. Planks to be used as the "bottom chords" 134 of the truss 130 are positioned on the cogs 126 (FIG. 8B). The leftmost bottom chord 134 is aligned with the x-offset mark penciled onto the table 120 earlier. The top chords 132 are then positioned using the cogs 126 (FIG. 8C). The rake and rafter length are marked on both top chords 132. These should be even with the heel cut on the bottom chords 134 on each end. In the event (and as illustrated) the truss 130 includes overhangs on its lower end, a jig stop 136 can be placed to position these. The "web" planks 138 are then inserted between the top and bottom chords 132, 134 (FIG. 8D). It is preferred at this point to verify the specified height of the truss 130; if it is incorrect, the rake mark can be moved within ⅛ inch while keeping both lower ends of the truss 130 even. The planks should then be secured with jigging fixtures 140 and slide cogs 142 as desired; preferred jigging fixtures include those illustrated and described in co-assigned and co-pending U.S. patent application Ser. Nos. 08/522,283 and 08/735,415.

It is preferred that, after the set-up truss 130 is laid out, the truss tables 120 be marked with the locations of heels and splices. Marking these will simplify the placement of planks during production.

Figure 8E:
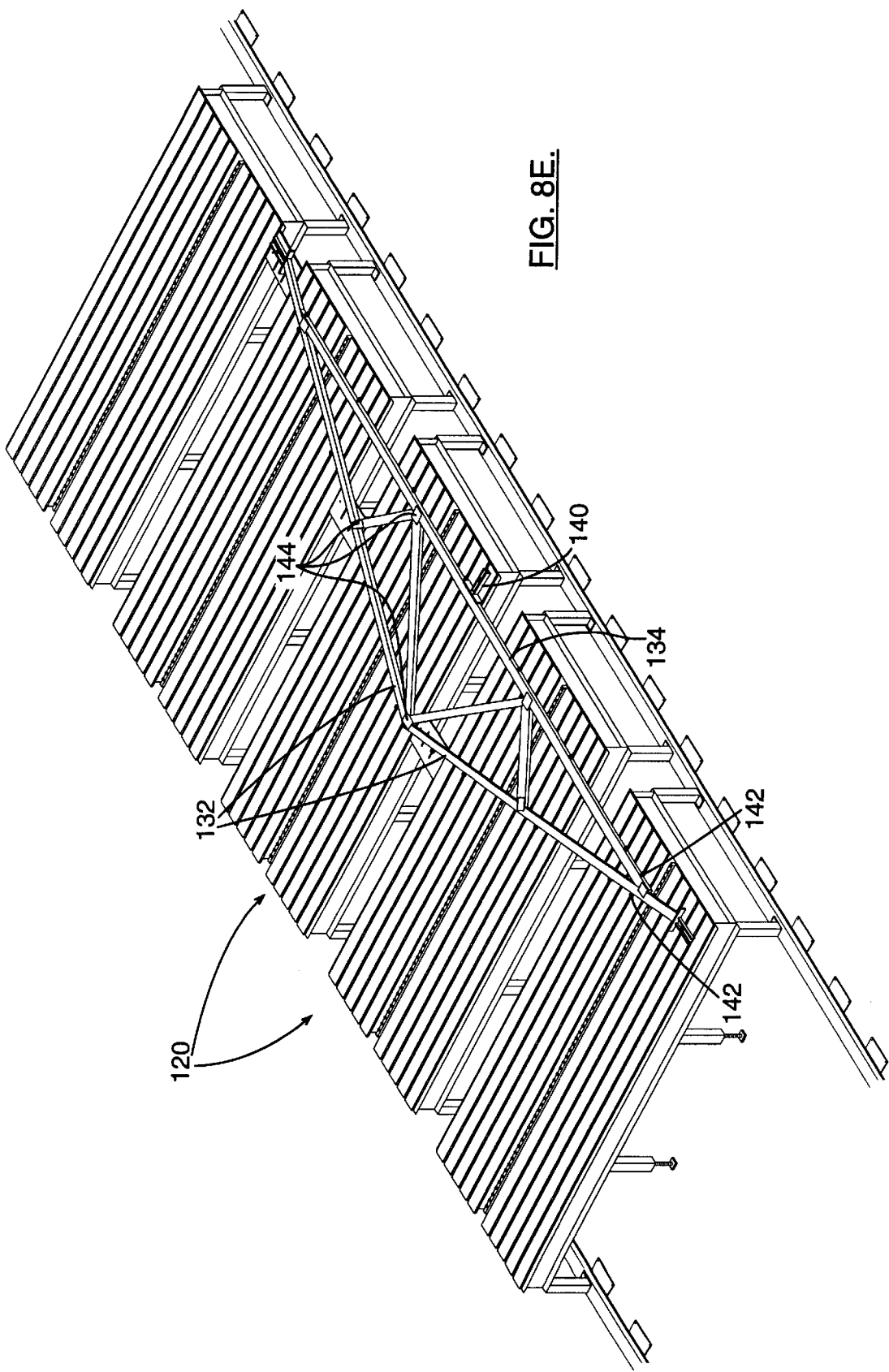

After the jigging fixtures 140 and cogs 142 are positioned, connector plates 144 as specified are placed at the truss joints on the top surfaces of the planks and secured with a hammer (FIG. 8E). The claw of the hammer can be used to raise the secured joint so that another connector plate can be inserted into the bottom surface of the joint. At this point, the set-up truss 130 is ready for processing with a pressure roller.

Figure 9A:
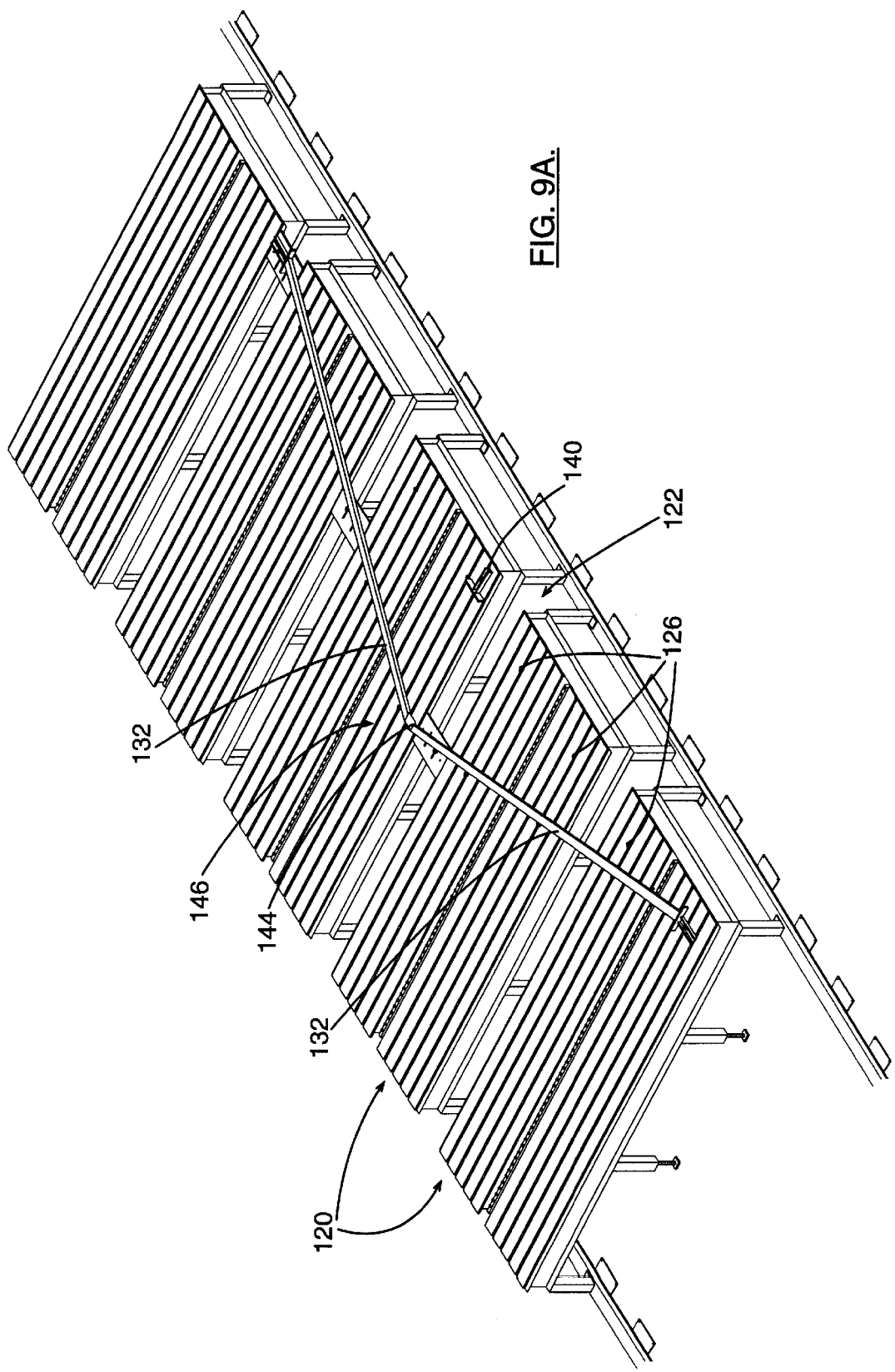

Once the set-up truss 130 has been removed, the positioning cogs 126, 142 and jigging fixtures 140 remain in place to receive additional planks during production runs of trusses 130 of the same configuration (FIG. 9A). A typical production crew comprises three workers: two "heelmen" and one "peakman." Initially, the peakman walks through the passageway 122 between the tables 120 that positions him nearest the peak 146 of the truss 130. He carries with him webs 138 that attach to the peak 146. He is handed the upper ends of the top chords 132 by the heelmen, positions these against the cogs 126, 142 and jigging fixtures 140, and secures them at the peak 146 with connector plates 144 on the upper and lower surfaces thereof.

Figure 9B:
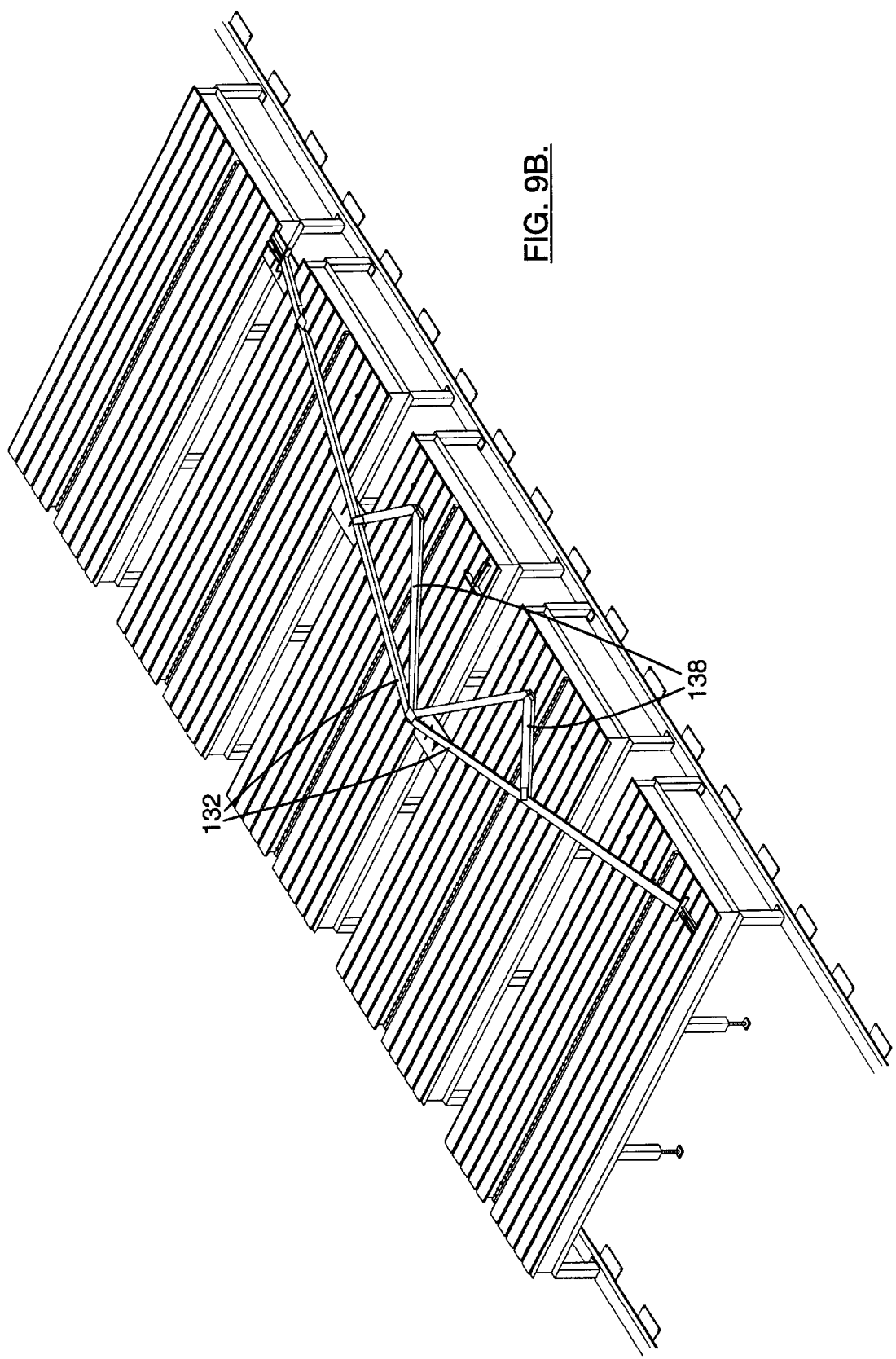

As the peakman exits the passageway, he positions additional webs that have been preplated with the lower connector plate of the peak (FIG. 9B). The heelmen position and plate other webs to the top chord. The heelmen also position the bottom chord planks 134 as the peakman leaves the passageway 122 (FIG. 9C). The top chord 132 and webs 138 are then plated to the bottom chord 134, and any bottom chord splice is also plated.

It can be seen that, with this method, none of the workers are required to climb upon the truss tables 120 to insert connector plates 144; instead, they are able to access all joints from passageways between the tables 120.

Expandable Rollerbed Trailer Positioning System

Figure 10:
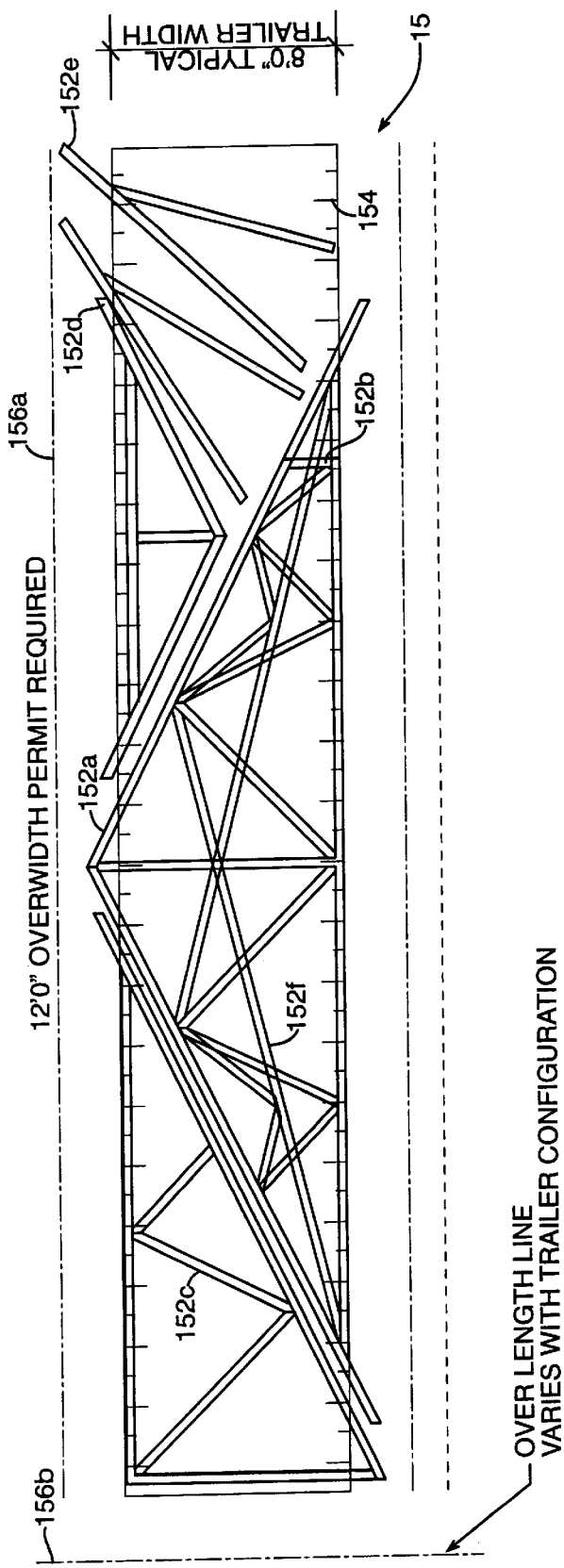
FIG. 10 illustrates the display of movable images of various trusses superimposed on a fixed image of an expandable rollerbed trailer.

Referring now to FIG. 10, the present invention facilitates minimizing the time and effort required to position fabricated trusses on an expandable rollerbed trailer by displaying movable images of trusses superimposed on a stationary image of an expandable rollerbed trailer. In the illustrated embodiment, an image 150 of an expandable rollerbed trailer is shown having various truss images 152a–152f superimposed thereon. The movable truss images 152a–152f and stationary expandable rollerbed trailer image 150 may be displayed via a computer display or monitor operatively coupled with a personal computer or other data processing system.

The expandable rollerbed trailer image 150 includes a layout grid 154 for indicating positions of truss images thereon. The scale units of the layout grid in the illustrated embodiment are in feet. However, other units of scale may be utilized without departing from the spirit and intent of the present invention. Preferably, various expandable rollerbed trailer images associated with different size expandable rollerbed trailers are stored within the data processing system and can be retrieved depending on the particular expandable rollerbed trailer to be loaded.

Preferably, indicia 156a for indicating a maximum over-width dimension and indicia 156b for indicating a maximum over-length dimension is associated with the expandable rollerbed trailer image 150, as illustrated. By displaying over-width and over-length indicia 156a,156b the user can position truss images on the expandable rollerbed trailer image 150 so as not to exceed respective over-width and over-length dimensions. By positioning trusses within the over-width and over-length dimensions, the need for special transportation permits may be avoided. The over-width and over-length indicia 156a,156b may vary depending on the particular expandable rollerbed trailer to be loaded. Preferably, the over-width and over-length indicia 156a, 156b are stored within a data processing system and can be retrieved with a respective expandable rollerbed trailer image 150. Warning indicia (not shown) may also be utilized to indicate to the user when a truss image is positioned beyond the over-width and over-length indicia 156a,156b.

In the illustrated embodiment, the truss image 152a represents a common truss, the truss image 152b represents a stub truss, the truss image 152c represents a mono-truss, the truss image 152d represents a piggy back truss, the truss image 152e represents an open-ended jack, and the truss image 152f represents a scissors truss. It is to be understood that trusses having the same configuration are often bundled together for shipping. Accordingly, the various truss images 152a–152f may represent bundled trusses of a respective configuration.

Figure 11:
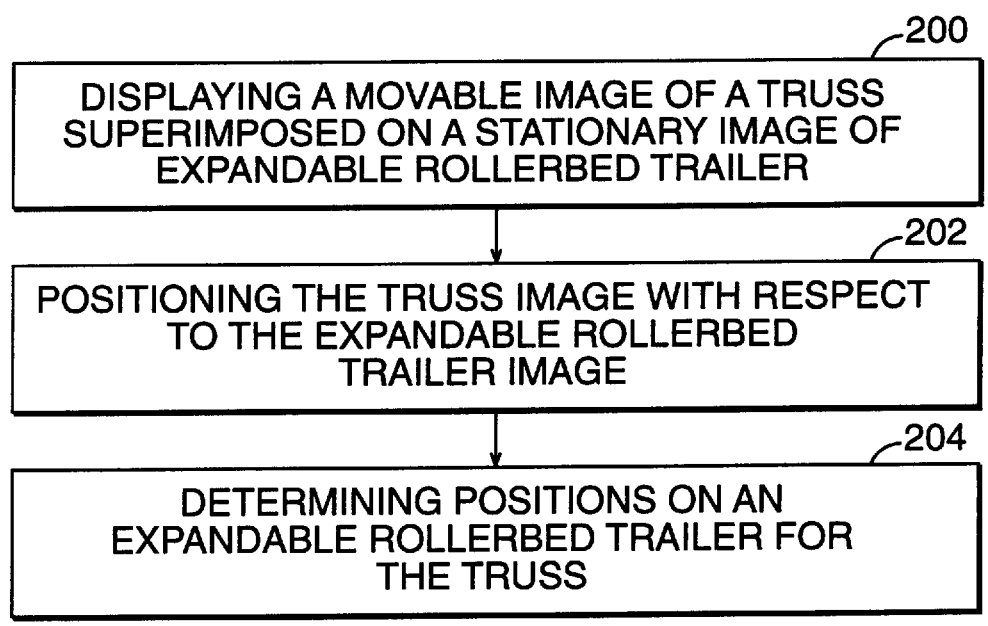
FIG. 11 illustrates operations for positioning a truss on an expandable rollerbed trailer, according to the present invention.

Referring now to FIG. 11, operations for the present invention include: displaying a movable image of a truss superimposed on a stationary image of expandable rollerbed trailer (Block 200); positioning the truss image with respect to the expandable rollerbed trailer image (Block 202); and determining positions on an expandable rollerbed trailer for the truss (Block 204). Using a mouse, keyboard or other input device operatively connected to a data processing system, a user may position and re-position truss images with respect to an expandable rollerbed trailer image to determine optimum positioning. User positioning can include moving the truss image laterally (i.e., in directions perpendicular to the edge portions of an expandable rollerbed trailer) and rotating the truss image about an axis normal to the expandable rollerbed trailer.

When optimum positioning of various truss images is obtained, a print out or display of position information can be generated. Using this information, a lift truck operator can quickly determine the desired location of each truss (or truss bundle) and accurately position the truss (or truss bundle) on an expandable rollerbed trailer. It is to be understood that the present invention may be used to position trusses loaded on any type of trailer or truck bed, and is not limited to expandable rollerbed trailers.

The present invention is advantageous because various shaped trusses can be efficiently loaded onto an expandable rollerbed trailer in a selected order. Preferably, loading arrangements for various truss configurations and expandable rollerbed trailer sizes are stored making repeat loading operations easy to complete.

Hardware and Software Requirements

Hardware for implementing the present invention is generally consistent with typical personal computing equipment, and does not generally require special environmental conditions other than a typical office environment. Preferably, the present invention is implemented on an International Business Machines (IBM®) or IBM®-compatible personal computer. Even more preferable is hardware based on an Intel® 486 or Pentium® processor and having at least sixteen (16) megabytes of memory and having data storage capacity of at least fifty (50) megabytes. Also preferred is a printer suitable for text and color graphical report printing; automatic back-up capability for data and configuration files; and trackball or mouse support. The present invention may be implemented via other computing devices, including, but not limited to, mainframe computing systems and mini-computers. It is preferable to use a high resolution color display; however, a standard personal computer monitor may be used.

The present invention may be written in various computer languages including, but not limited to, C++, Smalltalk, Java, and other conventional programming languages such as BASIC, FORTRAN and COBOL. The present invention runs on current standard desktop computer platforms such as, but not limited to, Windows®, Windows 95®, Windows NT®, UNIX®, and OS/2®. The present invention utilizes, in part, many standard features of current desktop configurations, such as the ability to store data locally, connect to the Internet, and display visual information.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A data processing system for positioning a truss including a plurality of truss plates on a plurality of spaced apart truss tables comprising:

an input device and a display;

means for displaying on said display a movable image of said truss superimposed on a stationary image of each of said truss tables, said truss image including indicia at each location where a respective truss plate is to be embedded in said truss, said indicia having a first appearance when a respective truss plate location completely overlies a truss table image and a second appearance, different from said first appearance, when a portion of said respective truss plate location overlies space between adjacent truss table images;

means for positioning said truss image and each of said truss table images relative to one another via said input device such that indicia for at least one truss plate location has a first appearance indicating that said at least one truss plate location completely overlies one of said truss tables; and means responsive to said positioning means for determining positions on said truss tables of mechanical stops for restraining said truss during fabrication.

2. A system according to claim 1 further comprising means within said data processing system for displaying a representation of said mechanical stops on said display.

3. A system according to claim 1 wherein said positioning means comprises means for automatically positioning said truss image with respect to each of said truss table images such that a maximum number of indicia for respective truss plate locations have a first appearance indicating that a maximum number of said truss plate locations completely overlie said truss table images.

4. A system according to claim 1 wherein each of said truss table images includes a representation of an ejector unit slot.

5. A system according to claim 4 wherein said indicia has a third appearance, different from said first appearance, when a portion of a respective truss plate location is positioned over an ejector unit slot in a respective one of said truss table images.

6. A system according to claim 4 wherein said indicia first appearance is a first color and where said indicia second appearance is a second color.

7. A system according to claim 5 wherein said indicia third appearance is a third color.

8. A system according to claim 1 wherein said displaying means further comprises means for displaying an image of a pedestal between adjacent truss table images and beneath a respective truss plate location when a portion of said respective truss plate location overlies space between adjacent truss table images.

9. A system according to claim 1 wherein said positioning means comprises means for rotating said truss image and each of said truss table images relative to each other.

10. A method of positioning a wood truss including a plurality of truss plates on a plurality of spaced apart truss tables, comprising the steps of:

displaying a movable image of said truss superimposed on stationary image of each of said truss tables, said truss image including indicia at each location where a respective truss plate is to be embedded in said truss, said indicia having a first appearance when a respective truss plate location completely overlies a truss table image and a second appearance, different from said first appearance, when a portion of said respective truss plate location overlies space between adjacent truss table images;

positioning said truss image and each of said truss table images relative to one another such that indicia for at least one truss plate location has a first appearance indicating that said at least one truss plate location completely overlies one of said truss tables; and determining positions on said truss tables of mechanical stops for restraining said truss during fabrication.

11. A method according to claim 10 further comprising the step of displaying a representation of said mechanical stops on said display.

12. A method according to claim 10 wherein said positioning step comprises automatically positioning said truss image with respect to each of said truss table images such that a maximum number of indicia for respective truss plate locations have a first appearance indicating that a maximum number of truss plate locations completely overlie said truss table images.

13. A method according to claim 10 wherein said displaying step comprises displaying an ejector unit slot on each of said truss table images.

14. A method according to claim 13 wherein said indicia has a third appearance, different from said first appearance, when a portion of a respective truss plate location is positioned over an ejector unit slot in a respective one of said truss table images.

15. A method according to claim 14 wherein said indicia third appearance is a third color.

16. A method according to claim 10 further comprising the step of displaying an image of a pedestal between adjacent truss table images and beneath a respective truss plate location when a portion of said respective truss plate location overlies space between adjacent truss table images.

17. A method according to claim 10 wherein said indicia first appearance is a first color and where said indicia second appearance is a second color.

18. A method according to claim 10 wherein said positioning step comprises rotating said truss image and each of said truss table images relative to each other.

19. A computer program product for use with a data processing system for positioning a truss including a plurality of truss plates on a plurality of spaced apart truss tables, said computer program product comprising:

a computer usable medium having computer readable program code means embodied in said medium for displaying on a display connected to said data processing system a movable image of said truss superimposed on a stationary image of each of said truss tables, said truss image including indicia at each location where a respective truss plate is to be embedded in said truss, said indicia having a first appearance when a respective truss plate location completely overlies a truss table image and a second appearance, different from said first appearance, when a portion of said respective truss plate location overlies space between adjacent truss table images;

the computer usable medium having computer readable program code means embodied in said medium for positioning said truss image and said truss table images relative to one another such that indicia for at least one truss plate location has a first appearance indicating that said at least one truss plate location completely overlies one of said truss tables; and the computer usable medium having computer readable program code means embodied in said medium for determining locations of stops on said truss tables for restraining said truss during fabrication.

20. A computer program product according to claim 19, further comprising computer readable program code means for displaying a representation of said mechanical stops on said display.

21. A computer program product according to claim 19, wherein said computer readable program code means for positioning said truss image with respect to each of said truss table images comprises computer readable program code means, embodied in said media, for automatically positioning said truss image with respect to each of said truss table images such that indicia for a maximum number of truss plate locations have a first appearance indicating that a maximum number of truss plate locations completely overlie said truss table images.

22. A computer program product according to claim 19, wherein said computer readable program code means for displaying a movable image of said truss superimposed on a stationary image of each of said truss tables comprises computer readable program code means, embodied in said media, for displaying a representation of an ejector slot on each of said truss table images.

23. A computer program product according to claim 19, wherein said computer readable program code means for displaying a movable image of said truss superimposed on a stationary image of each of said truss tables comprises computer readable program code means, embodied in said media, for displaying said indicia with a third appearance, different from said first appearance, when a portion of a respective truss plate location is positioned over an ejector unit slot in a respective one of said truss table images.

24. A computer program product according to claim 19, further comprising computer readable program code means for displaying an image of a pedestal between adjacent truss table images and beneath a respective truss plate location when a portion of said respective truss plate location overlies space between adjacent truss table images.

25. A computer program product according to claim 19, wherein said computer readable program code means for displaying a movable image of said truss superimposed on a stationary image of each of said truss tables comprises computer readable program code means, embodied in said media, for displaying said indicia first appearance as a first color and for displaying said indicia second appearance as a second color.

26. A computer program product according to claim 19, wherein said computer readable program code means for displaying a movable image of said truss superimposed on a stationary image of each of said truss tables comprises computer readable program code means, embodied in said media, for displaying said indicia third appearance as a third color.

27. A computer program product according to claim 19, wherein said computer readable program code means for positioning said truss image with respect to each of said truss table images comprises computer readable program code means, embodied in said media, for rotating said truss image and each of said truss table images relative to each other.

28. A data processing system for positioning first and second trusses having respective first and second configurations, and including a plurality of truss plates, on a plurality of spaced apart truss tables comprising:

an input device and a display;

means for displaying on said display movable images of said first and second trusses superimposed on a stationary image of each of said truss tables, said first and second truss images including indicia at each location where a respective truss plate is to be embedded in said first and second trusses, said indicia having a first appearance when a respective truss plate location completely overlies a truss table image and a second appearance, different from said first appearance, when a portion of said respective truss plate location does not overlie a truss table image;

means for positioning said first and second truss images with respect to each of said truss table images via said input device such that indicia for at least one truss plate has an appearance indicating that each respective truss plate location completely overlies one of said truss tables; and means responsive to said positioning means for determining positions on said truss tables of mechanical stops for restraining said first and second trusses during fabrication such that a plurality of said mechanical stops can be used for restraining said first and second trusses without being repositioned.

29. A system according to claim 28 further comprising means within said data processing system for displaying a representation of said mechanical stops on said display.

30. A system according to claim 28 wherein said positioning means comprises means for automatically positioning said truss image with respect to each of said truss table images such that indicia for a maximum number of truss plate locations have a first appearance indicating that a maximum number of truss plate locations completely overlie said truss table images.

31. A system according to claim 28 wherein each of said truss table images includes a representation of an ejector unit slot.

32. A system according to claim 31 wherein said indicia first appearance is a first color and where said indicia second appearance is a second color.

33. A system according to claim 31 wherein said indicia has a third appearance, different from said first appearance, when a portion of a respective truss plate location is positioned over an ejector unit slot in a respective one of said truss table images.

34. A system according to claim 33 wherein said indicia third appearance is a third color.

35. A system according to claim 28 wherein said display means further comprises means for displaying an image of a pedestal between adjacent truss table images and beneath a respective truss plate location when a portion of said respective truss plate location overlies space between adjacent truss table images.

36. A system according to claim 28 wherein said positioning means comprises means for rotating said truss image and each of said truss table images relative to each other.

37. A data processing system for positioning a truss bundle on an expandable rollerbed trailer comprising:

an input device and a display;

means for displaying on said display a movable image of said truss bundle superimposed on a stationary image of said expandable rollerbed trailer, said stationary image of said expandable rollerbed trailer including indicia for indicating a maximum over-width dimension and indicia for indicating a maximum over-length dimension;

means responsive to user input via said input device for positioning said truss bundle image with respect to said expandable rollerbed trailer image so as not to extend beyond said indicia indicating a maximum over-width dimension and said indicia indicating a maximum over-length dimension; and means responsive to said positioning means for determining a position on said expandable rollerbed trailer of said truss bundle that complies with a positioned truss bundle image.

38. A system according to claim 37 wherein said positioning means comprises means for warning a user when said movable image of said truss bundle is positioned beyond said indicia indicating a maximum over-width dimension or said indicia indicating a maximum over-length dimension.

39. A method of positioning a truss bundle on an expandable rollerbed trailer, the method comprising the steps of:

(a) displaying a movable image of the truss bundle superimposed on a stationary image of the expandable rollerbed trailer, the stationary image of the expandable rollerbed trailer including indicia for indicating a maximum over-width dimension and indicia for indicating a maximum over-length dimension;

(b) positioning the truss bundle image with respect to the expandable rollerbed trailer image so as not to extend the truss bundle image beyond the indicia indicating a maximum over-width dimension and the indicia indicating a maximum over-length dimension; and (c) positioning the truss bundle on the expandable rollerbed trailer in compliance with truss bundle image displayed in step (b).

40. A method according to claim 39 wherein said step (b) further comprises warning a user when the movable image of the truss bundle is positioned beyond the indicia indicating a maximum over-width dimension or the indicia indicating a maximum over-length dimension.

\* \* \* \* \*

UNITED STATES PATENT AND TRADEMARK OFFICE
CERTIFICATE OF CORRECTION

PATENT NO.    :    5,873,567
DATED         :    February 23, 1999
INVENTOR(S)   :    Thomas H. Williams It is certified that error appears in the above-identified patent and that said Letters Patent is hereby corrected as shown below:

Title page, item [75],    correct Tomas H. Williams to read Thomas H. Williams

Signed and Sealed this

Twelfth Day of October, 1999

Attest:

Q. TODD DICKINSON

Attesting Officer    Acting Commissioner of Patents and Trademarks